Oct. 29, 1940.  P. E. ZUCK ET AL  2,219,799
HEADREST
Filed Sept. 10, 1938
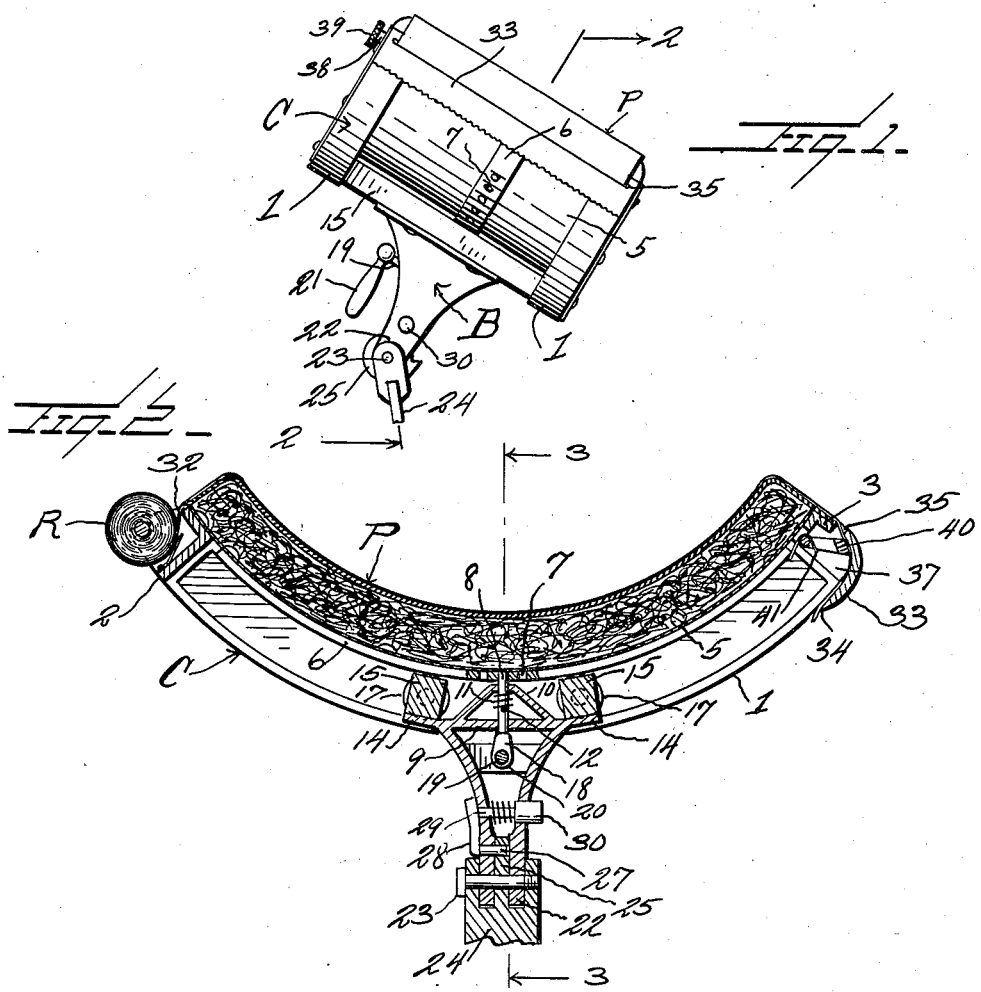
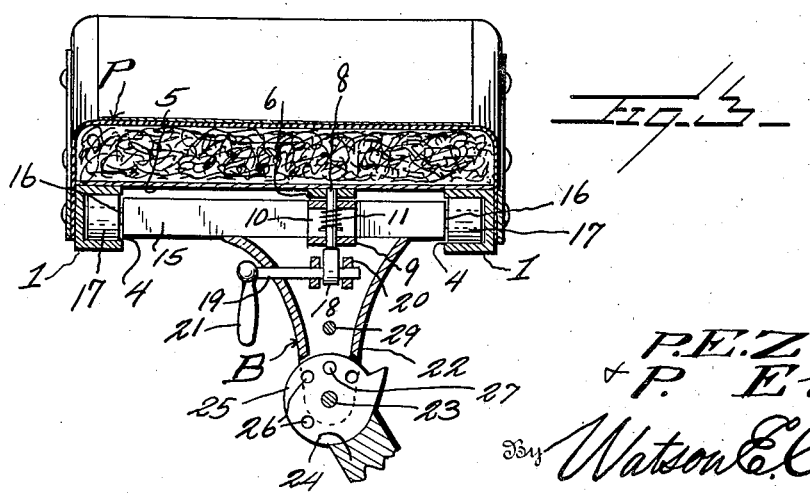
Inventors
P. E. Zuck
& P. Evans
By Watson E. Coleman
Attorney Patented Oct. 29, 1940

2,219,799

UNITED STATES PATENT OFFICE 2,219,799

HEADREST

Paul E. Zuck and Paul Evans, Stillwater, Okla.

Application September 10, 1938, Serial No. 229,372

3 Claims. (Cl. 155—177)

This invention relates to a headrest, and it is an object of the invention to provide a rest of this kind for use on barber chairs, dentist chairs or wherever desired and which headrest is so constructed and arranged to provide ease in operation and comfort to the customer or patient being served.

Another object of the invention is to provide a headrest which permits the head of a person to be turned on the axis of his or her neck without the necessity of raising the head from the rest when it is desired to turn the head to a new position.

The invention also has for an object to provide a headrest constructed and arranged so that it may be readily equipped with paper for passing all sanitary requirements.

A further object of the invention is to provide a headrest so constructed to include a carriage that may be selectively locked in substantially any position within its range of travel and thereby allowing the operator to place the carriage in whatever position is most suitable for the work he is performing.

The invention also has for an object to provide a headrest which permits the desired adjustment of the head of a person being served without the necessity of the operator touching the head.

The invention consists in the details of construction and in the combination and arrangement of the several parts of our improved headrest whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:

Figure 1 is a view in side elevation of a headrest constructed in accordance with an embodiment of our invention, the associated staff being in fragment;

Figure 2 is an enlarged sectional view taken substantially on the line 2—2 of Figure 1;

Figure 3 is a sectional view taken substantially on the line 3—3 of Figure 2.

As disclosed in the accompanying drawing, the headrest comprises a carriage C having the arcuate side members 1 in suitable spaced relation. These members 1 are connected at their extremities by the end pieces 2 and 3 which are welded or otherwise securely connected to the side members 1.

The side members 1, as particularly illustrated in Figure 3, are channel members with their flanges inwardly disposed whereby is provided the trackways 4 for a purpose to be hereinafter more particularly referred to.

Suitably secured to the upper surfaces of the side members 1 and the end pieces 2 and 3 and overlying the space defined by such members is the plate 5, preferably of metal, which provides a suitable backing for the upholstery pad or cushion P. Suitably secured to the under surface of the plate 5 is a locking strip 6 extending from one cross piece 2 to the second cross piece 3. This strip 6 is provided therealong with the spaced openings 7 with adjacent openings in relatively close proximity. These openings 7 are adapted to selectively receive the upper or outer end portion of a locking pin 8 to hold the carriage C in desired adjustment as will hereinafter be more particularly referred to.

The locking pin 8 is slidably disposed through the upper portion of a body or truck member B. This member B is of a bell formation with its larger end upwardly disposed, said larger end of the member B being intersected by a cross arm 9 through which the pin 8 freely passes, said pin being also freely disposed through the apex portion of the upwardly directed guide bracket 10 carried by the cross arm 9. This bracket 10, as herein disclosed, is in the form of an inverted V.

The locking pin 8 is constantly urged inwardly of the member B by an expansible member 11, herein disclosed as a coil spring, encircling the pin 8 and interposed between the apex portion of the bracket 10 and a stop 12 carried by the pin 8 at a point between the arm 9 and the apex portion of the bracket 10.

The upper or larger extremity of the body B at opposite sides is formed to provide the outstanding platforms 14 upon which are mounted the bolsters 15. These bolsters 15 in the assembly of a headrest are disposed transversely of the carriage C and substantially bridge the space between the side members 1. The extremities of each of these bolsters 15 are provided with the outstanding stub axles 16 on which are mounted the rollers 17 which engage within the trackways 4. By this assembly the carriage C may be readily oscillated in either direction with respect to the member B. While the head of a person is being supported by said carriage, the axis of such oscillation is substantially the same as the axis of the neck about which the head of the person may turn.

After the head of the person has been turned as desired together with the required oscillation of the carriage C, the carriage is locked in such position to maintain the head of the person in required adjustment by engagement of the locking pin 8 within an opening 7. In the present embodiment of our invention this engagement of the pin is accomplished upon required upward swinging movement of the cam element 18 carried by the rock shaft 19. This shaft 19 is rotatably supported by a pair of parallel and spaced arms 20 intersecting the body member B and suitably secured to the wall thereof. The cam 18 is positioned between these arms 20 thus assuring the maintenance of the cam 18 at all times in effective position.

The shaft 19 is of a length to extend exteriorly of the body member B and said extended portion carries a suitable handle 21 whereby the shaft 19 may be readily turned to raise the cam 18 to lift the pin 8 into braking engagement with the strip 6 or said cam 18 may be swung downwardly to permit the pin 8 to move into a released or inoperative position under the action of the expansible member or spring 11.

The lower or restricted end portion of the member B is formed to provide a bifurcated shank 22 which is pivotally connected in a well known manner, as at 23, with the upper end portion of the staff 24 which is of any ordinary or preferred type in accordance with the character of the chair with which it is to be used.

The connection between the shank 22 of the member B and the staff 24 includes an upstanding locking plate 25 which is received within the kerf of the bifurcated shank 22. This plate 25 in its peripheral portion is provided with the circumferentially spaced openings 26 to selectively receive a locking pin 27 slidably disposed through the shank 22 at one side of the kerf thereof. This pin 27 is carried by an upstanding plate 28 arranged exteriorly of the member B and the upper portion of this plate 28 carries a pin 29 which freely extends through the shank 22 and beyond the opposite side thereof. The outer end portion of this pin 29 is formed to provide a button 30 which, as a result of pressure thereon, will move the plate 28 outwardly with respect to the shank 22 a distance sufficient to release the pin 27 from the plate 25 whereupon the body B may be readily swung about its pivot 23 to any desired adjustment. Upon obtaining this new adjustment the pin 27 is received within the required opening 26 thus locking the body B together with the carriage C carried thereby in such selective adjustment with respect to the staff 24.

Within the body B and surrounding the pin 29 is an expansible member 31. This member 31 bears against the inner end of the button 30 and the opposed wall portion of the member B. This expansible member or coil spring 31 serves to constantly urge the button 30 outwardly and, of course, the pin 27 in the same direction.

The end piece 2 as herein disclosed comprises an inverted L-bar and each end thereof is closed by a plate 32 which projects a distance beyond the top flange of the member to provide for the convenient mounting of a roll R of sanitary paper as is required in connection with headrests.

The end piece 3 in cross section is of a form somewhat similar to a reversed C with the lower portion 33 of its curved wall extending a slight distance inwardly of the adjacent extremities of the side members 1 and spaced therefrom. The outer edge margin of this portion 33 is formed to provide a cutting edge 34. The piece 3 closely adjacent to its top is provided therealong with a slot 35 of a length at least equal to the width of the sanitary paper sheet. Each end of this piece 3 is closed by a plate 37 which butts the adjacent end of a side member 1. Each of the plates 37 provides a mounting for the rock shaft 38, one end portion of which extends beyond one side of the carriage C and carrying an operating head 39 whereby said shaft 38 may be conveniently rocked in one direction by the operator.

This shaft 38 within the member 3 carries a clamping pawl 40 which effectively holds the free end portion of the paper sheet against the portion 33 whereby the paper sheet is maintained in desired position upon the upholstery pad or cushion P. In the use of the paper roll the sheet after the roll has been placed in position is threaded through the slot 35 within the member 3 and then extended out beyond the cutting edge 34 a distance sufficient to allow the same to be readily grasped by the fingers of a hand when it is desired to draw off the portion of the sheet that has been used and to bring a fresh portion of the sheet into position. When it is desired to draw the sheet, the operator turns the head 39 in a direction to move the clamping pawl 40 away from the portion 33 of the member 3 whereby the paper sheet can be readily pulled out as desired and said withdrawn portion can be readily cut off in a well known manner through the medium of the cutting edge 34. The pawl 40 is constantly urged toward the portion 33 or into clamping position by the suitably arranged spring 41.

From the foregoing description it is thought to be obvious that a head rest constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. A chair headrest comprising a hollow member for attachment to a staff, elements carried by said member and extending beyond opposite sides thereof, a carriage comprising arcuate side members, said side members being of a cross sectional configuration to provide inwardly facing trackways, means on the elements carried by the hollow member over which said trackways travel to allow oscillation of the carriage with respect to the member, means carried by the carriage upon which the head of a person is to be rested, a locking strip carried by the carriage and extending lengthwise thereof, and locking means within the hollow member for selective engagement with the locking strip at points therealong to hold the carriage in selected position with respect to the member.

2. A headrest for chairs comprising a hollow member having means for attachment to a support, a carriage upon which the head of a person is to be rested, coacting means carried by the carriage and the member for connecting the carriage and the member with the carriage above the member, said coacting means being so constructed and arranged to permit movement of the carriage in an arcuate path with respect to the member and about a center above the carriage, a rotatably supported shaft extending within the member and having means exteriorly of the member for rotating the same, a cam within the member and carried by the shaft, a locking pin carried by the member for endwise movement, said pin being positioned for contact on one end thereof by the cam for moving the pin outwardly for braking engagement with means on the carriage to hold the carriage in a selected adjusted position, and means for constantly urging the pin in the opposite direction.

3. A headrest for chairs comprising a hollow member having means for attachment to a support, a carriage upon which the head of a person is to be rested, coacting means carried by the carriage and the member for connecting the carriage and the member with the carriage above the member, said coacting means being so constructed and arranged to permit movement of the carriage in an arcuate path with respect to the member and about a center above the carriage, a rotatably supported shaft extending within the member and having means exteriorly of the member for rotating the same, a cam within the member and carried by the shaft, a locking strip carried by the carriage and extending lengthwise thereof, said strip having a series of longitudinally spaced recesses, a locking pin carried by the member for endwise movement, said pin being positioned for contact on one end thereof by the cam for moving the pin outwardly for selective engagement in one of the recesses of the brake strip to hold the carriage in a selected adjusted position, and means for constantly urging the pin in the opposite direction.

PAUL E. ZUCK.
PAUL EVANS.